United States Patent [19]

Grawey et al.

[11] Patent Number: 4,695,420
[45] Date of Patent: Sep. 22, 1987

[54] METHOD OF FORMING A WINDOWED UNITARY PANEL

[75] Inventors: Charles E. Grawey; Scot L. Winters, both of Peoria, Ill.

[73] Assignee: Caterpillar Inc., Peoria, Ill.

[21] Appl. No.: 764,525

[22] Filed: Aug. 12, 1985

Related U.S. Application Data

[63] Continuation of Ser. No. 694,492, Jun. 25, 1984, abandoned.

[51] Int. Cl.[4] .............................................. B29C 61/00
[52] U.S. Cl. .................... 264/265; 264/275; 264/279; 264/328.6; 264/328.18; 264/342 R; 264/348; 264/DIG. 65
[58] Field of Search ............... 264/252, DIG. 65, 229, 264/274, 265, 271.1, 275, 279, 276, 230, 272.13, 1.7, 328.1, 328.18, 237, 342 R, 348, 328.6

[56] References Cited

U.S. PATENT DOCUMENTS

| 2,966,435 | 12/1960 | Kassinger . | |
|---|---|---|---|
| 3,263,014 | 7/1966 | Deisenroth . | |
| 3,415,709 | 12/1968 | Santangelo | 264/274 |
| 3,493,458 | 2/1970 | Santangelo . | |
| 3,523,994 | 8/1970 | Shockey . | |
| 3,671,370 | 6/1972 | Littell, Jr. . | |
| 3,694,540 | 9/1972 | Slan | 264/230 |
| 3,763,290 | 10/1973 | Sheld . | |
| 3,778,528 | 12/1973 | Heifetz et al. . | |
| 3,872,198 | 3/1975 | Britton . | |
| 4,161,060 | 7/1979 | Lenne et al. . | |
| 4,341,831 | 7/1982 | Kleiss . | |
| 4,372,524 | 2/1983 | Pailler . | |
| 4,517,136 | 5/1985 | Hemery | 264/274 |

FOREIGN PATENT DOCUMENTS 40-24381 10/1965 Japan .
41-12509 7/1966 Japan .

Primary Examiner—Jan H. Silbaugh
Assistant Examiner—Hubert C. Lorin
Attorney, Agent, or Firm—John W. Grant

[57] ABSTRACT

A method of forming a windowed unitary panel having a peripheral edge portion of a windowpane of glazing integrally embedded within a frame of high modulus plastic material includes heating the pane to a preselected temperature prior to its being positioned within a mold. The peripheral edge portion of the windowpane protrudes into the mold cavity so that the high modulus plastic material forming the frame encapsulates the peripheral edge portion. This prevents buckling of the windowpane since the preheated windowpane contracts simultaneously with the contraction of the rigid frame as it cools from the molding temperature to ambient.

7 Claims, 4 Drawing Figures

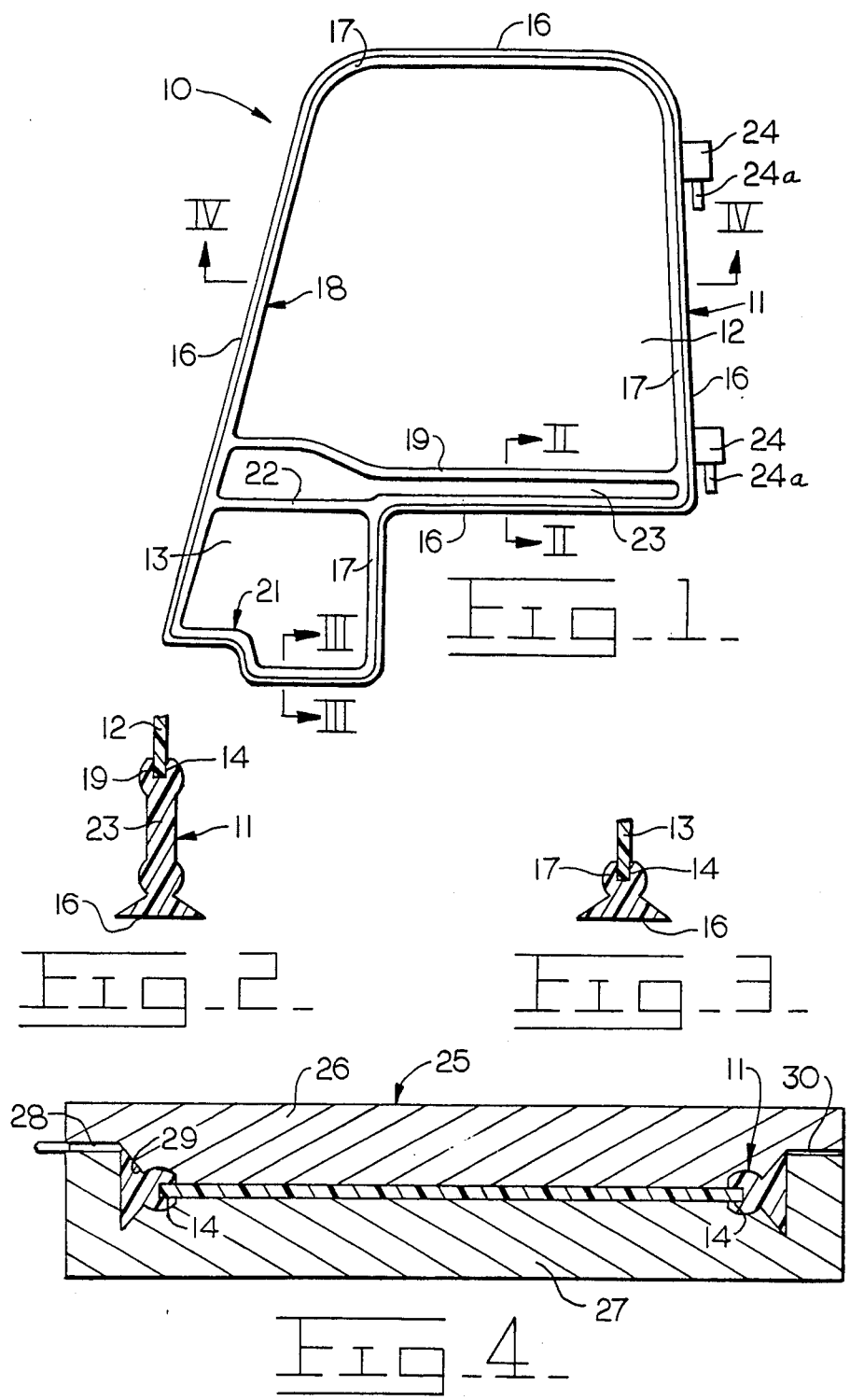

METHOD OF FORMING A WINDOWED UNITARY PANEL

This is a continuation of Ser. No. 694,492, filed June 25, 1984, now abandoned.

DESCRIPTION

1. Technical Field

This invention relates generally to reaction injection molding and more particularly to a method of molding a unitary panel in which a windowpane of glazing material is integrally captured within a molded frame.

2. Background Art

The excellent molding qualities of today's plastic materials permit the molding of plastic articles having a variety of complex shapes and sizes. Many of these plastic articles need little or no additional machining and are much more economical to manufacture than comparable metal articles. Such articles include the panels and doors of vehicle or equipment enclosures.

As a practical matter, however, the doors and panels used in the various vehicle or equipment applications must have structural strength sufficient to withstand the abuse normally associated with that type of equipment. For example, the cab doors must have sufficient structural stiffness to prevent flexing so that a substantially airtight fit can be achieved when the door is closed. This often requires a flat rigid frame, fabricated from metal or molded in rigid plastic.

Moreover, the windows in many doors have heretofore been mechanically connected to the door frame. The act of producing this connection is a costly and time-consuming operation. Also, the connection is not generally of the type which adds structural integrity to either member. The glazing usually floats in a soft gasket channel, isolated from the frame. This isolation is used not only to reduce shock-loads transmitted between frame and glazing, but also to reduce thermal stresses induced by the varying coefficients of thermal expansion between the frame and glazing materials. If transparent plastic is used as the glazing in such a door panel and it is desired to reduce the plastic thickness for cost savings, the mechanical connection may allow the plastic windows to flex or bend relative to the frame with possible escape from the connection.

In one earlier attempt to both reduce the cost of the total door structure and to take advantage of the added structural integrity afforded by a unitary construction, a preshaped pane of transparent plastic was integrally molded into the door frame as the window thereof. One of the problems encountered in this process was that the windowpane in the finished door was distorted and wavy. Moreover, the door frame had a tendency to warp. Upon investigating this problem, it was found that the structural integrity necessarily built into the door frame to prevent flexing was not compatible with enclosing the windowpane therein. More specifically, it was determined that as the door frame cooled from the reaction injection molding temperature to ambient, the frame thermally contracted sufficiently to apply relatively high compressive forces to the windowpane causing it to buckle.

The present invention is directed to overcoming one or more of the problems as set forth above.

DISCLOSURE OF THE INVENTION

In one aspect of the present invention, a method of forming a unitary windowed panel having a rigid frame of high modulus plastic material and a transparent window having its peripheral edge integrally embedded within the frame comprises the steps of heating a pane of transparent glazing to a preselected temperature, positioning the preheated pane within a mold so that the peripheral edge protrudes into the mold cavity and injecting into the mold cavity the constituent ingredients of the high modulus plastic material for forming the frame and encapsulating the peripheral edge of the pane.

The present invention provides a method of forming a unitary panel having the peripheral edge of a transparent windowpane integrally embedded within a frame constructed of high modulus plastic material. The transparent windowpane is preheated to a preselected temperature and the plastic material is injected and molded around the preheated windowpane. Preheating the windowpane causes it to expand such that as the formed unitary door cools from the elevated molding temperature, both the windowpane and the plastic material contract at substantially the same rate preferably with the windowpane contracting to a slightly greater degree than the frame. This eliminates the compressive forces and causes low tensile stresses to be imparted to the windowpane, thereby eliminating the buckling of the windowpane.

BRIEF DESCRIPTION OF THE DRAWINGS

FIG. 1 is a side elevational view of a door formed by the method of the present invention;

FIG. 2 is a sectional view taken along line II—II of FIG. 1;

FIG. 3 is a sectional view taken along line III—III of FIG. 1; and

FIG. 4 is a sectional view taken along line IV—IV of FIG. 1 and diagrammatically showing a sectional view of the mold.

BEST MODE FOR CARRYING OUT THE INVENTION

Referring now to the drawings, a windowed unitary panel is generally indicated by the reference numeral 10 and in the present embodiment is a unitary door for a cab (not shown) of an industrial vehicle. The door has a rigid frame 11 and a pair of transparent windowpanes 12 and 13 each having its peripheral edge portion 14 embedded within the frame 11. The frame 11 is bounded by a substantially flat portion 16 joined to an inwardly disposed rib 17. An upper portion 18 of the rib 17 is joined by a cross rib 19 to circumscribe the upper windowpane 12. As best seen in FIGS. 2 and 4, the peripheral edge portion 14 of the windowpane 12 is integrally embedded within the upper portion 18 of the rib 17 and the cross rib 19. Similarly, a lower portion 21 of the rib 17 is joined by another cross rib 22 to circumscribe the lower windowpane 13 such that the peripheral edge portion 14 of the lower windowpane 13 is integrally embedded within the lower portion 21 of the rib 17 and the cross rib 22. A beam section 23 spans the width of the frame 11 and is integrally joined to the lower edge of the cross rib 19 and to an upper portion of the cross rib 22 and to a portion of the rib 17 to form a substantially "I" beam cross section. A pair of hinges 24 are integrally molded on the rearward edge of the door frame. Each of the hinges 24 has a hinge pin 24a molded therein.

FIG. 4 diagrammatically illustrates a mold 25 in which the unitary door 10 is formed. The mold includes an upper mold section 26 and a lower mold section 27. An inlet passage or gate 28 is provided in the upper mold section 25 and communicates with a mold cavity 29 formed between the upper and lower mold sections. The inlet gate 28 is typically a relatively narrow slot having a preselected length to introduce the plastic material into the mold cavity 29 under laminar flow conditions. A plurality of vent ports, one shown at 30, are provided in the upper mold section 26 for venting air from the mold cavity 29 as the plastic material is injected into the mold cavity 29.

The windowpanes 12 and 13 are sheets of transparent glazing and preferably sheets of plastic material such as polycarbonate and acrylic. In the present invention, the windowpane is a polycarbonate having a silicone hardcoat applied thereto to make it more scratch resistant. Such windowpanes are manufactured by General Electric Company under the trade name Margard. The silicone hardcoat on the peripheral edge portion is removed by sanding or grinding to assure good bonding between the frame 11 and the windowpanes 12 and 13.

The frame 11 is preferably molded from a high modulus plastic material such as polyurethane. In the present invention a shrink reducing filler material, such as glass fiber and glass flake, is added to the basic polyurethane resin so that the thermal expansion rate closely matches the thermal expansion rate of the polycarbonate. The filler also acts as a heat-sink in the curing material to moderate the temperature rise from the exothermic polyurethane reaction in the rib sections.

Further, a catalyst, such as Dibutyltin Dilaurate or Triethylene Diamine, is added in sufficient amounts to control the rate of the polyurethane reaction and thereby the rate of polyurethane heat evolution. The rate of reaction must be fast to be economically desirable, but it must be limited to be practical. Rate limiting of the heat evolution is important because, combined with the heat transfer rate out of the part, it controls the maximum temperature achieved in the curing panel. The outside walls of the panel will be approximately at the temperature of the mold, but the center of the rib sections 17, 19, 22 will generally be at some higher temperature. This temperature must be limited to prevent degradation and side-reactions of the material in the center of the part and should preferably be below 150 degrees Centigrade.

Similarly, the maximum preheat temperature of the polycarbonate glazing should preferably be below 132 degrees Centigrade, which is the glass transition temperature for this material. If the silicone-coated polycarbonate is heated to a temperature higher than the glass transition temperature, the plastic will become soft and deformable and may cause the silicone hardcoat to crack or craze.

By heating the polycarbonate glazing to some preselected temperature below the glass transition temperature, and by formulating catalysts in the polyurethane materials in an amount chosen to achieve a similar preselected average temperature in the curing polyurethane frame, a door panel may be produced which is initially near one average temperature for both the frame and glazing. If the coefficient of thermal expansion for the glazing is equal to or greater than the coefficient of thermal expansion for the frame, bowing caused by compressive thermal stresses between the frame and glazing will be eliminated for all temperatures below the preselected temperature. Preheating of the polycarbonate glazing will also increase the temperature and thereby the rate of reaction for the polyurethane near the glazing peripheral edges 14, which enhances the adhesive bond between the frame and the glazing.

In one specific example, the constituent ingredients of the polyurethane are set forth below with the percentages being by weight of the material.

| "B-Component" | |
|---|---|
| Union Carbide NIAX Polyol Resin D-446 | 31.1% |
| Owens-Corning Milled Glass Fiber 737AA 1/16 inch long | 24.9% |
| Owens-Corning Milled Glass Flake (1/64 sieve) | 6.2% |
| Columbian Carbon Raven 22 Carbon Black | 1.4% |
| M & T Chemical Catalyst T-12 Dibutyltin Dilaurate | 0.04% |
| Air Products Catalyst DABCO 33LV Triethylene Diamine | 0.04% |
| "A-Component" | |
| Rubicon Isocyanate M | 36.4% |

The method of forming the unitary door 10 includes the steps of heating the windowpanes 12,13 of transparent glazing to a preselected temperature, positioning the preheated windowpanes within a mold 25 so that the peripheral edges of the panes protrude into the mold cavity 29, and injecting into the mold cavity 29 the constituent ingredients of the high modulus plastic material for forming the rigid frame 11 and encapsulating the peripheral edge portions 14 of the windowpanes 12 and 13. The molded frame 11 becomes bonded to the peripheral edge portions 14 of the windowpanes 12,13 of glazing. The method also includes the step of selecting the constituent ingredients of the high modulus plastic material so that the frame 11 has an initial temperature and a coefficient of thermal expansion substantially the same as the initial temperature and coefficient of thermal expansion of the windowpanes.

The injection step includes rapid mixing of the reactive constituent ingredients above which causes an exothermic temperature rise in the plastic material essentially matching the preheated temperature of the polycarbonate window. In the present invention, the reaction temperature in the center of the curing plastic is about 143 degrees Centigrade and at the outside wall is about 60 degrees Centigrade. The preselected temperature to which the pane is heated is in the range of about 107 to 135 degrees Centigrade. Preferably the preselected temperature is about 121 degrees Centigrade.

The injection process utilized in the present invention is commonly referred to as "reaction injection molding" in which the constituent ingredients are brought together in a mixing chamber immediately prior to being injected into the inlet passages 28 in the mold 25. More specifically, all the ingredients listed above except the isocyanate are premixed and subsequently fed into the mixing chamber through one inlet passage while the isocyanate is fed into the mixing chamber through another passage.

In view of the foregoing, it is readily apparent that the structure of the present invention provides an improved method of forming a windowed unitary panel in which the windowpane is free of distortion. This is accomplished by preheating the windowpane prior to its being positioned within the mold so that as the unitary door cools from the molding temperature, both the frame and windowpane thermally contract about the same amount. This substantially prevents the frame from imparting compressive forces to the windowpane sufficient to buckle the windowpane. Moreover, the edges of the windowpane are bonded to the frame thereby greatly minimizing the flexibility of the windowpanes.

Other aspects, objects and advantages of this invention can be obtained from a study of the drawings, the disclosure and the appended claims.

We claim:

1. A method of forming a windowed unitary panel having a rigid frame of high modulus plastic material and a transparent windowpane having its peripheral edge integrally embedded within the rigid frame, comprising the steps of:

heating a pane of transparent glazing to a preselected temperature;

positioning the preheated pane within a mold so that the peripheral edge portion protrudes into a mold cavity; and injecting into the mold cavity the constituent ingredients of the high modulus plastic material causing the plastic material to exothermally rise to a molding temperature for forming the rigid frame and encapsulating the peripheral edge portion within the frame while the pane is in the preheated condition allowing both the pane and plastic material to cool from said temperatures such that the pane and plastic material contract at substantially the same rate to eliminate compressive forces and cause low tensile stresses to be imparted to the pane.

2. The method, as set forth in claim 1, including the step of adding a shrink-reducing filler material to the constituent ingredients in sufficient quantities so that the frame has a coefficient of thermal expansion substantially equal to the coefficient of thermal expansion of the windowpane of glazing.

3. The method, as set forth in claim 2, including the step of adding a catalyst to the constituent ingredients in an amount determined to produce an average molding temperature for the frame essentially equal to the preselected temperature.

4. The method, as set forth in claim 3, wherein the maximum temperature of the frame is about 143 degrees Centigrate and wherein the preselected temperature of the glazing is in the range of from about 107 degrees to 135 degrees Centigrade.

5. The method, as set forth in claim 4, wherein the preselected temperature is preferably about 121 degrees Centigrade.

6. The method of claim 5 wherein the high modulus plastic material is polurethane and the windowpane of glazing is polycarbonate.

7. A method of forming a windowed unitary panel having a rigid frame of high modulus plastic material and a transparent windowpane having its peripheral edge integrally embedded within the rigid frame, comprising the steps of:

expanding a pane of transparent glazing by heating the pane to a preselected temperature;

positioning the preheated and expanded pane within a mold so that the peripheral edge portion protrudes into a mold cavity; and injecting into the mold cavity the constituent ingredients of the high modulus plastic material causing the plastic material to exothermally rise to a molding temperature while the pane is in the preheated and expanded condition for forming the rigid frame and encapsulating the peripheral edge portion within the frame allowing both the pane and plastic material to cool from said temperatures such that the pane and plastic material contract at substantially the same rate to eliminate compressive forces and cause low tensile stresses to be imparted to the pane.

* * * * *

UNITED STATES PATENT AND TRADEMARK OFFICE
CERTIFICATE OF CORRECTION

PATENT NO. : 4,695,420

DATED : September 22, 1987

INVENTOR(S) : Charles E. Grawey et al.

It is certified that error appears in the above-identified patent and that said Letters Patent is hereby corrected as shown below:

In claim 1 at column 5, line 19, after "temperature" insert --so that said pane expands--.

In claim 6 at column 6, line 15, change "polurethane" to --polyurethane--.

Signed and Sealed this

Twelfth Day of July, 1988

Attest:

DONALD J. QUIGG

*Attesting Officer*      *Commissioner of Patents and Trademarks*